United States Patent [19]
Thomas, III et al.

[11] Patent Number: 5,851,187
[45] Date of Patent: Dec. 22, 1998

[54] METHOD AND APPARATUS FOR ULTRASONIC BEAMFORMING WITH SPATIALLY ENCODED TRANSMITS

[75] Inventors: Lewis Jones Thomas, III, Mitaka, Japan; Richard Yung Chiao, Clifton Park; Seth David Silverstein, Schenectady, both of N.Y.

[73] Assignee: General Electric Company, Schenectady, N.Y.

[21] Appl. No.: 943,081

[22] Filed: Oct. 1, 1997

[51] Int. Cl.⁶ .................................................. A61B 8/00
[52] U.S. Cl. ......................... 600/447; 600/443; 342/375
[58] Field of Search .................. 600/459, 447; 371/32, 35; 375/242; 342/165, 375, 174, 151

[56] References Cited

U.S. PATENT DOCUMENTS

| | | | |
|---|---|---|---|
| 5,014,712 | 5/1991 | O'Donnell | 600/447 |
| 5,329,930 | 7/1994 | Thomas, III et al. | 600/447 |
| 5,572,219 | 11/1996 | Silverstein et al. | 342/375 |
| 5,617,862 | 4/1997 | Cole et al. | 600/459 |

OTHER PUBLICATIONS

Lockwood et al., "Design of Sparse Array Imaging Systems", 1995 IEEE Ultrasonic Symp. Proc., pp. 1237–1243.

Primary Examiner—William E. Kamm
Assistant Examiner—Ali M. Imam
Attorney, Agent, or Firm—Marvin Snyder; Douglas E. Stoner

[57] ABSTRACT

The frame rate in medical ultrasound imaging is increased significantly by reducing the number of transmit events per image frame using spatially encoded transmit events in accordance with an invertible encoding matrix. First, M sets of encoded signals are transmitted, one set after the next, from M transmitting elements of a transducer array. For each transmission, all M transmitting elements are activated simultaneously in accordance with the encoding of a particular set of signals. The resulting scattering data are stored for each of the M transmit events, and are subsequently decoded with the inverse of the encoding matrix to obtain individual elemental information. The complete set of scattering data captures the time history of the ultrasound pulses that are transmitted from a single transducer element of the phased array, such as the m-th transmitter element, scattered by the medium under investigation, and subsequently received at the n-th receiver element, for all M transmitters and N receivers. The invertible code is preferably an orthogonal phase code such as a Hadamard code.

16 Claims, 3 Drawing Sheets

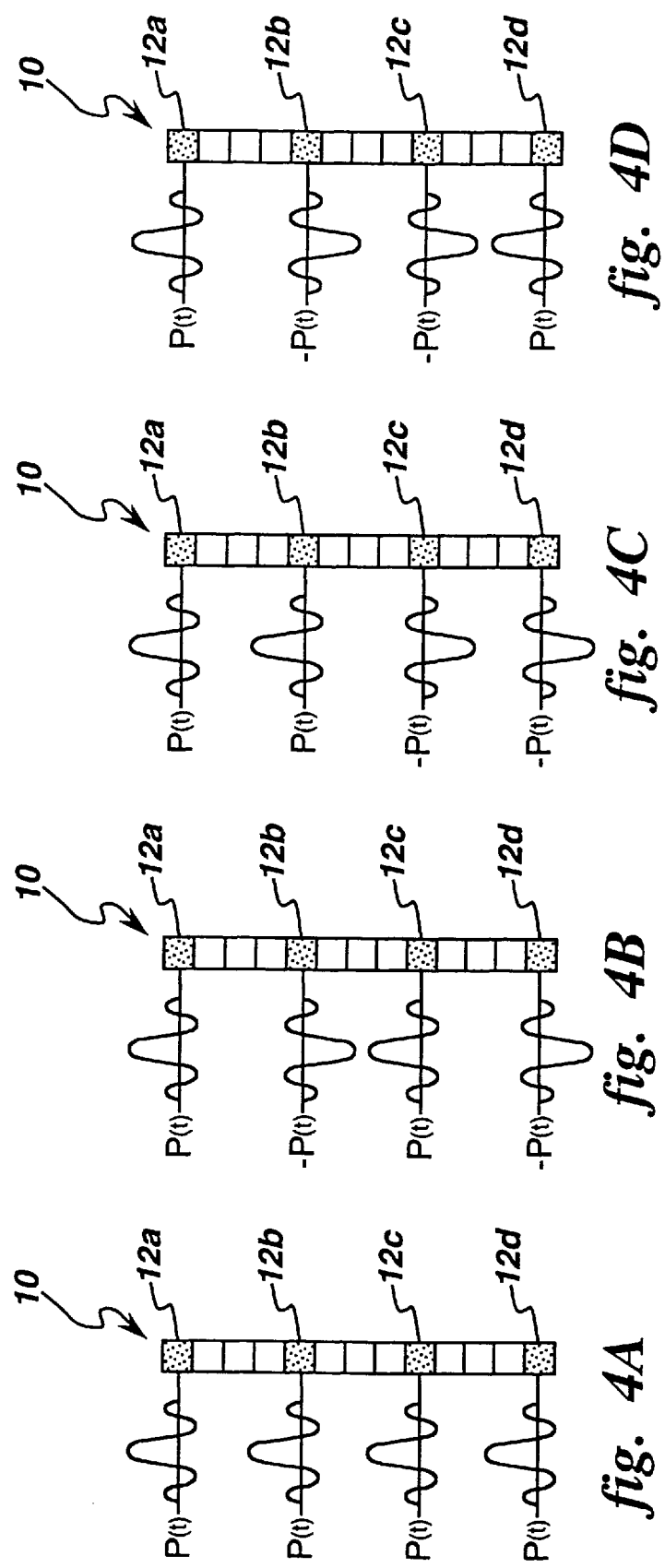

METHOD AND APPARATUS FOR ULTRASONIC BEAMFORMING WITH SPATIALLY ENCODED TRANSMITS

FIELD OF THE INVENTION

This invention generally relates to digital ultra-sound imaging systems. In particular, the invention relates to methods and apparatus for increasing the apparent acoustic frame rate of ultrasound images.

BACKGROUND OF THE INVENTION

Conventional medical ultrasound imaging systems comprise an array of ultrasonic transducer elements which are used to transmit an ultrasound beam and then receive the reflected beam from the object, e.g. anatomical region, being studied. Such scanning comprises a series of measurements in which the steered ultrasonic wave is transmitted, the system switches to receive mode after a short time interval, and the reflected ultrasonic wave is received and stored. Typically, transmission and reception are steered in the same direction during each measurement to acquire data from a series of points along an acoustic beam or scan line. The receiver is dynamically focused at a succession of ranges along the scan line as the reflected ultrasonic waves are received.

For ultrasound imaging, the array typically has a multiplicity of transducer elements arranged in one or more rows and driven with separate voltages. By selecting the time delay (or phase) and amplitude of the applied voltages, the individual transducer elements in a given row can be controlled to produce ultrasonic waves which combine to form a net ultrasonic wave that travels along a preferred vector direction and is focused at a selected point along the beam. The beamforming parameters of each of the firings may be varied to provide a change in maximum focus or otherwise change the content of the received data for each firing, e.g., by transmitting successive beams along the same scan line, with the focal point of each beam being shifted relative to the focal point of the previous beam. By changing the time delay and complex amplitude of the applied voltages, the beam with its focal point can be moved in a plane to scan the object.

The same principles apply when the transducer probe is employed to receive the reflected sound in a receive mode. The voltages produced at the receiving transducer elements are summed so that the net signal is indicative of the ultrasound reflected from a single focal point in the object. As with the transmission mode, this focused reception of the ultrasonic energy is achieved by imparting a separate time delay (and/or phase shift) and gain to the signal from each respective receiving transducer element. The output signals of the beamformer channels are then coherently summed to form a respective pixel intensity value for each sample volume in the object or volume of interest. These pixel intensity values are log-compressed, scan-converted and then displayed as an image of the anatomical region being scanned.

The frame rate of medical ultrasound imaging systems is determined by the number of transmit events necessary per frame. In conventional ultrasound imaging systems, a transmit event is a focused beam transmitted in a particular direction or at a particular focal position. For example, in a conventional ultrasound array in which the transmit aperture is shifted across the array, each transmit aperture consists of M transmit elements fired in parallel to form a focused transmit beam. The transmit beam is scanned across the field of view (FOV) over K transmit events to generate a single frame. At the edges of the array, the transmit aperture may have less than M transmit elements. The receive aperture consists of N elements centered at the center of the transmit aperture. The number of receive elements N is determined by the receive f number specified and the imaging depth.

High-frame-rate systems are desirable for present-day two-dimensional (2D) imaging and necessary for future real-time three-dimensional (3D) imaging. The frame rate can be improved by decreasing the number of transmit events per frame. This has been conventionally accomplished with a proportional reduction in the number of transmit elements used in each transmit event, which results in very poor signal-to-noise ratio (SNR).

SUMMARY OF THE INVENTION

The present invention relates to a method and an apparatus for significantly increasing the frame rate in medical ultrasound imaging by reducing the number of transmit events per image frame. In particular, high frame-rate medical ultrasound imaging is performed with improved SNR using spatially encoded transmit events. The complete set of scattering data captures the time history of the ultrasound pulses that are transmitted from a single transducer element of the phased array, such as the m-th transmitter element, scattered by the medium, and subsequently received at the n-th receiver element, for all M transmitter elements and N receiver elements. The m→n elemental scattering data are extracted while transmitting simultaneously from all the transmitting elements. The individual m→n elemental data can be recovered if the transmit signals are spatially coded with an invertible code, preferably an orthogonal phase code such as a Hadamard code.

In the preferred embodiment of the invention, M sets of encoded signals are transmitted, one set after the next, from M transmitting elements of a transducer array. For each transmission, all M transmitting elements are activated simultaneously in accordance with the encoding of a particular set. The resulting scattering data are stored for each of the M transmit events. The stored scattering data are subsequently decoded with the inverse of the encoding matrix to obtain individual elemental information.

BRIEF DESCRIPTION OF THE DRAWINGS

FIGS. 4A–4D are schematic illustrations of encoded pulsing for first through fourth transmit events, respectively, in which the coding corresponds to the four columns of a 4×4 Hadamard matrix.

DETAILED DESCRIPTION OF THE PREFERRED EMBODIMENTS

Figure 1:
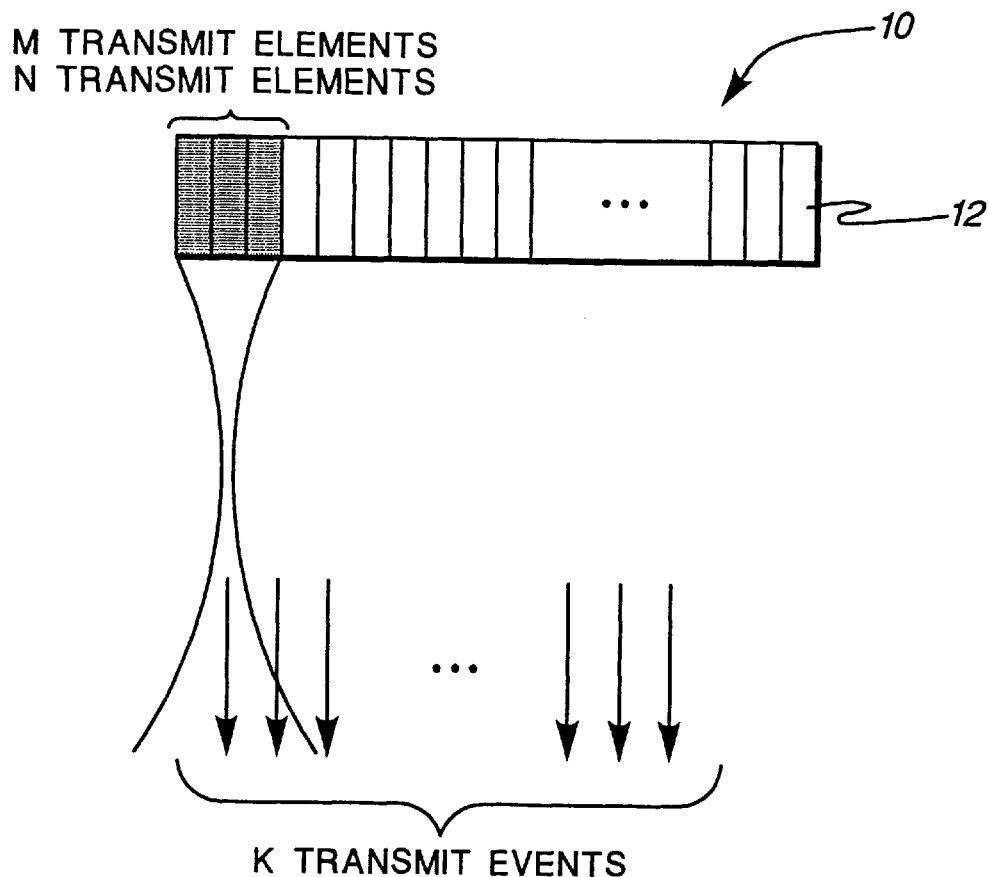
FIG. 1 is a schematic illustration of a transducer array having a shifting aperture formed by M transmit elements, each aperture transmitting a focused beam in accordance with conventional ultrasound data acquisition.

In the conventional ultrasound imaging technique shown in FIG. 1, K transmit events are fired consecutively from an array 10 of transducer elements 12, employing respective transmit and receive apertures which are shifted across the array for each firing. For M transmitting elements (shown shaded) in the transmit aperture and N receiving elements in the receive aperture, the beam is formed by summing over N received signals for each transmit event, where the received signal amplitude is $MS_0$, $S_0$ being the received signal amplitude at each receiving element, and the noise standard deviation is $\sigma$. In this case, the signal-to-noise ratio is:

$$SNR = N^{1/2} M(S_0/\sigma).$$

For K transmit events fired consecutively and each using a single transmit element, it can be shown that the SNR degrades by a factor of $M/K^{1/2}$ from the conventional case, which is large for small K. In particular, for M transmit elements, K=M transmit events and N receive elements, the beam is formed by summing over the M×N complete data set, where the received signal amplitude is $S_0$ and the noise standard deviation is $\sigma$. In this case, the signal-to-noise ratio is:

$$SNR = (MN)^{1/2}(S_0/\sigma).$$

In the preferred embodiment of the invention, M sets of encoded signals are transmitted, one set after the next, from M transmitting elements of a transducer array. For each transmission, all M transmitting elements are activated simultaneously in accordance with the coding in a respective column of an invertible encoding matrix. The resulting scattering data are subsequently decoded with the inverse of the encoding matrix to obtain a complete set of scattering data representing the time history of the ultrasound pulses that are transmitted from the m-th transmitter element, scattered by the medium, and subsequently received at the n-th receiver element, for all M transmitters and N receivers.

For each transmit event, the number of encoded transmit elements equals M and the number of receive elements equals N, where the number of transmit events K=M. After decoding, the received signal amplitude is MSO and the noise standard deviation equals $M^{1/2}\sigma$. Beamforming is performed after decoding by summing over the M×N complete data set. The resulting signal-to-noise ratio is:

$$SNR = MN^{1/2}(S_0/\sigma)$$

Thus, the spatial encoding process of the invention increases the SNR for collection of the complete scattering data by 10 log(M) decibels relative to the SNR that would be obtained by measuring the data using transmissions from a single element at a time, for the same number of transmit events.

Figure 2:
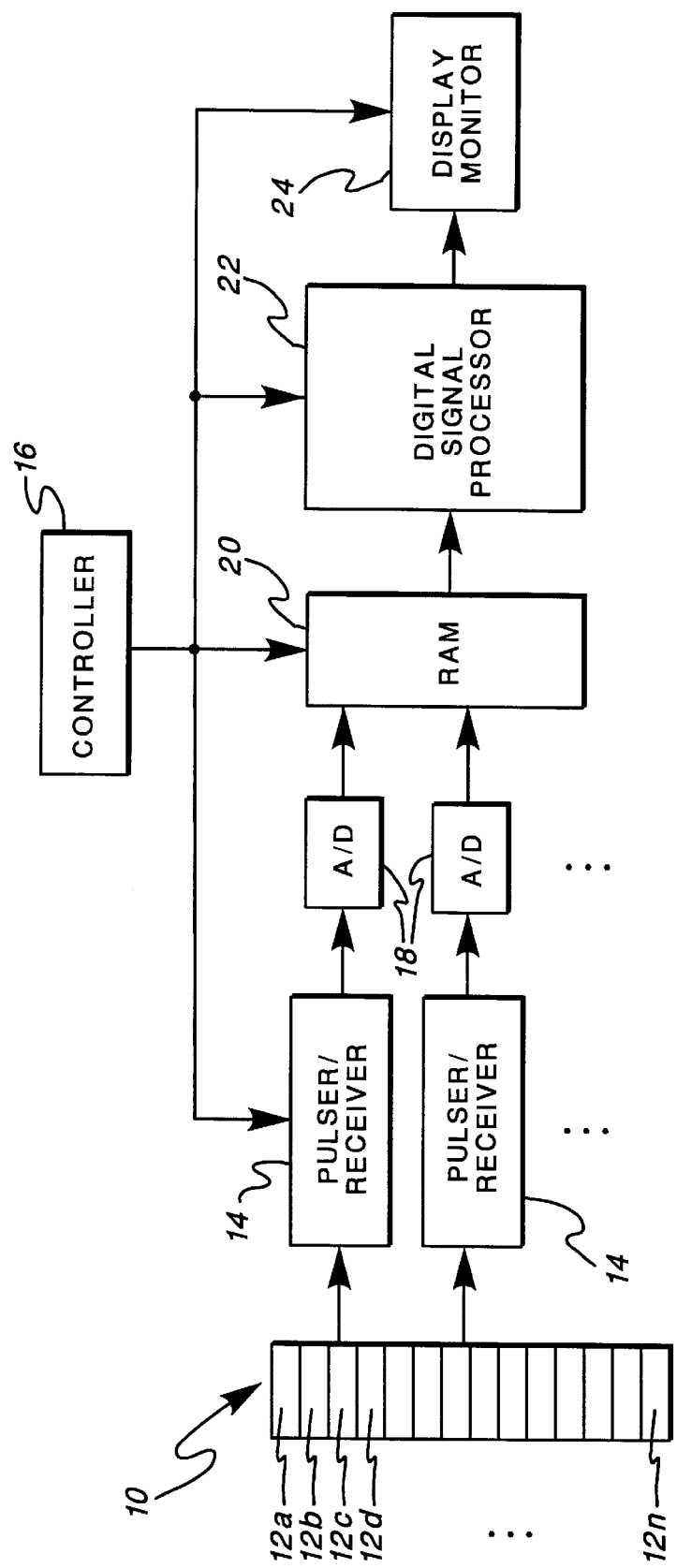
FIG. 2 is a block diagram showing a digital ultrasound imaging system in accordance with the preferred embodiment of the invention.

In FIG. 2, the ultrasonic imaging system incorporating the invention is shown to include a transducer array 10 comprised of a plurality of separately driven transducer elements 12a–12n, each of which produces a burst of ultrasonic energy when energized by a pulsed waveform produced by a respective pulser/receiver 14. The ultrasonic energy reflected back to transducer array 10 from the object under study is converted to an electrical signal by each receiving transducer element and applied separately to a respective pulser/receiver 14. The pulser/receivers 14 are operated under control of a digital controller 16 responsive to commands by a human operator.

Assuming there are M transmit elements in an array of L transducer elements, where L≧M transducer elements, the M elements are simultaneously activated to transmit unfocused ultrasound waves during each one of K=M transmit events. For each transmit event, a different M-element code vector is applied to the pulser/receivers by controller 16 to drive the transmit elements. The M M-element code vectors form the columns of a M×M matrix 0 which is invertible. The matrix $Q^{-1}$ has columns $q_1, q_2, \ldots, q_M$.

For each transmit event M, m=1, 2, ... M, the backscattered signal $R_{mn}(t)$, n=1, 2, ..., N, is transduced into electrical signals at a set of N receive elements. These electrical signals are amplified and transmitted, by the respective pulser/receivers 14, to respective analog-to-digital converters 18 (see FIG. 2). For each transmit event, the digitized signals are stored in a random access memory 20 under the control of controller 16. Upon completion of the K transmit events corresponding to one image frame, the data stored in RAM 20 are retrieved and then transformed, i.e., decoded, into another data set $D_{mn}(t)$ by a digital signal processor 22. Digital signal processor 22 also performs beamforming on the decoded image data. The decoded and beamformed image data are then displayed on a video monitor 24 as a single image frame. This process is repeated to produce a succession of image frames as the transducer array is scanned over the region or volume of interest.

Data set $D_{mn}(t)$ is transformed in accordance with the following formula:

$$D_{mn}(t) = \sum_{i=1}^{M} q_m(i) R_{in}(t)$$

This transformation decodes the set of K transmit events, each of which had been transmitted on a group of M=K elements, to obtain a data set where the transmit elements are isolated, i.e., $D_{mn}(t)$ corresponds to the signal received at receive element n from transmit element m.

Figure 3:
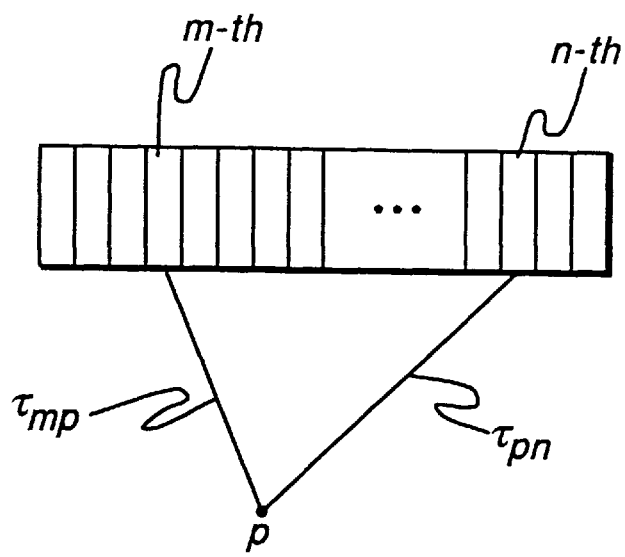
FIG. 3 is a schematic illustration of the paths of transmission and scattering for an ultrasound wave transmitted by the m-th transmit element, scattered by a scatterer located at a position ρ, and received by the n-th receive element.

The decoded data set $D_{mn}(t)$ can be beamformed to produce a confocal image. The decoded data for each position ρ, shown in FIG. 3, are beamformed in accordance with the formula:

$$B(p) = \sum_{m=1}^{M} \sum_{n=1}^{N} a_{mn} D_{mn}(t - \tau_{mp} - \tau_{pn})$$

where $\tau_{mp}$ is the time for the transmitted pulse to propagate from the m-th transmit element to position ρ; $\tau_{pn}$ is the time for the scattered pulse to propagate from position ρ to the n-th receive element; and $a_{mn}$ is the apodization function for the m-th transmit element and the n-th receive element.

The decoded data set contains the same information (complete data) as that obtained by transmitting on each of the M transmit elements consecutively while receiving on all N receive elements for each transmit event, except it has 10 log(M) decibels gain in SNR.

Although any invertible matrix can be used as the encoding matrix, there are significant benefits to choosing the Hadamard matrix as the encoding matrix. The elements of the Hadamard matrix are either +1 or −1, which can be implemented easily as phase inversion in the transmit electronics. The inverse of a symmetric Hadamard matrix is simply the scaled version of itself $Q_N^{-1} = (1/N)Q$. In general, the decoding process involves the M(M−1) operations (additions and multiplications) on the received data sets. However, for Hadamard encoding, the decoding can be performed in M log$_2$M operations (additions only). Hadamard matrices may be generated by the following recursion:

$$Q_2 = \begin{bmatrix} 1 & 1 \\ 1 & -1 \end{bmatrix}$$

$$Q_{2m} = \begin{bmatrix} Q_m & Q_m \\ Q_m & -Q_m \end{bmatrix}$$

where M=2, 4, 8, 16, . . .

A simplified example using the Hadamard matrix for the case M=4 is shown in FIGS. 4A–4D, which depicts the encoded pulsing of four transmit elements in an array for each of four consecutive transmit events. The +1 and −1 elements of the Hadamard matrix are transformed into pulses of opposite phase by the pulser/receivers (not shown in FIGS. 4A–4D) and designated either P(t) or −P(t), as appropriate. In particular, the transmit elements 12a–12d are driven using the following Hadamard code vectors: [+1+1+1+1] for the first transmit event (see FIG. 4A); [+1−1+1−1] for the second transmit event (see FIG. 4B); [+1+1−1−1] for the third transmit event (see FIG. 4C); and [+1−1−1+1] for the fourth transmit event (see FIG. 4D). The decoding to produce the equivalent data set wherein only the first transmit element is fired consists of adding all four received data sets together and dividing by 4. The decoding to produce the equivalent data set wherein only the second transmit element is fired consists of adding the first and third received data sets together, subtracting the remaining received data sets from the sum and dividing by 4. The decoding to produce the equivalent data set wherein only the third transmit element is fired consists of adding the first and second received data sets together, subtracting the remaining received data sets from the sum and dividing by 4. Finally, the decoding to produce the equivalent data set wherein only the fourth transmit element is fired consists of adding the first and fourth received data sets together, subtracting the remaining received data sets from the sum and dividing by 4.

The spatial encoding method also enables several other known methods of SNR gain to be used. First, because the net ultrasonic wave produced by the transducer array is unfocused, the peak amplitude occurs near the surface of the transducer array and is much weaker than at the peak of a focused transmitted wave. Therefore, the transmitted pressure amplitude can be significantly increased and still satisfy regulatory limits when using this spatial encoding scheme. Second, each individual transmit element can be replaced by a group of elements whose output signals are delayed such that the composite source emulates a point source with higher output signal amplitude. For example, if the group has three elements, a point source can be emulated by firing the center element first and then firing the two elements on either side with a predetermined delay, thereby generating a diverging wave which emulates a point source located behind the transducer surface. Last, excessive frame rate from the very small number of transmit events may be traded for SNR by video integration, i.e., by incoherent summing of the magnitudes.

The number of transmit events, or equivalently, the number of transmit elements, is severely limited by the coherence of the received data in the presence of motion. The received data must be sufficiently coherent to allow for selective focusing in a chosen region. A time error not exceeding $\lambda/16$ has been deemed acceptable for this purpose.

While only certain preferred features of the invention have been illustrated and described, many modifications and changes will occur to those skilled in the art. It is, therefore, to be understood that the appended claims are intended to cover all such modifications and changes as fall within the true spirit of the invention.

We claim:

1. A system for imaging ultrasound scatterers, comprising:
    an ultrasound transducer array for transmitting ultrasound waves and detecting ultrasound echoes reflected by said ultrasound scatterers, said transducer array comprising a multiplicity of transducer elements;
    pulser/receiver means coupled to said transducer array for pulsing M transducer elements of said multiplicity of transducer elements, for M transmit events, with signals which are spatially encoded with an invertible code provided by an invertible encoding matrix, and for receiving signals from N transducer elements of said multiplicity in response to ultrasound echoes following each of said M transmit events;
    analog-to-digital conversion means coupled to said pulser/receiver means for converting each of said received signals into a respective digital signal;
    means for decoding M×N digital signals by employing the inverse of said encoding matrix to form a decoded data set and for forming a beamformed data set from said decoded data set; and
    a display monitor for displaying an image which is a function of said beamformed data set.

2. The system as defined in claim 1, wherein said invertible code comprises an orthogonal phase code.

3. The system as defined in claim 2, wherein said orthogonal phase code comprises a Hadamard code.

4. The system as defined in claim 1, wherein said means for decoding M×N digital signals and for forming a beamformed data set comprises a digital signal processor.

5. A system for imaging ultrasound scatterers, comprising:
    an ultrasound transducer array for transmitting ultrasound waves and detecting ultrasound echoes reflected by said ultrasound scatterers, said transducer array comprising a multiplicity of transducer elements;
    pulser/receiver means coupled to said transducer array for pulsing M sets of transducer elements of said multiplicity of transducer elements, for M transmit events, with signals which are spatially encoded with an invertible code in accordance with an invertible encoding matrix, such that spatially encoded signals for the transducer elements within the same set are delayed so as to cause a composite source to emulate a point source, said pulser/receiver means being adapted to receive signals from N transducer elements of said multiplicity following each of said M transmit events;
    analog-to-digital conversion means coupled to said pulser/receiver means for converting each of said received signals into a respective digital signal;
    means for decoding M×N digital signals by employing the inverse of said encoding matrix to form a decoded data set and for forming a beamformed data set from said decoded data set; and
    means for displaying an image which is a function of said beamformed data set.

6. The system as defined in claim 5, wherein said invertible code comprises an orthogonal phase code.

7. The system as defined in claim 6, wherein said orthogonal phase code comprises a Hadamard code.

8. The system as defined in claim 5, wherein said means for decoding M×N digital signals and for forming a beamformed data set comprises a digital signal processor.

9. A method for acquiring ultrasound scattering data using a multiplicity of M transducer elements formed in a transducer array, comprising the steps of:

driving said multiplicity of M transducer elements of the transducer array simultaneously using transmit pulses spatially encoded with an invertible code derived in accordance with a column of an M×M encoding matrix, the step of driving being performed once for each column of said M×M encoding matrix in successive transmit events;

receiving signals from N transducer elements of said multiplicity following each of said M transmit events;

converting each of said received signals into a respective digital signal;

decoding M×N digital signals by employing the inverse of said encoding matrix to form a decoded data set; and forming a beamformed data set from said decoded data set.

10. The method as defined in claim 9, wherein said invertible code comprises an orthogonal phase code.

11. The method as defined in claim 10, wherein said orthogonal phase code comprises a Hadamard code.

12. The method as defined in claim 9, wherein the step of driving is performed by driving each of said M transducer elements with either a predetermined pulse waveform or the phase inversion of said predetermined pulse waveform in accordance with values obtained from said encoding matrix.

13. A method for acquiring ultrasound scattering data using a multiplicity of M groups of transducer elements formed in a transducer array, each group comprising first and second adjacent transducer elements, comprising the steps of:

driving said first transducer element of each of said multiplicity of M groups of transducer elements of the transducer array simultaneously using transmit pulses spatially encoded with an invertible code derived in accordance with a respective column of an M×M encoding matrix, the step of driving being performed once for each column of said M×M encoding matrix in a first set of successive transmit events;

driving said second transducer element of each of said multiplicity of M groups of transducer elements of the transducer array simultaneously using transmit pulses spatially encoded with said invertible code derived in accordance with said respective column of said M×M encoding matrix, said second transducer elements being driven once for each column of said M×M encoding matrix in a second set of successive transmit events, the transmit event of said second set corresponding to a particular matrix column being delayed relative to the transmit event of said first set corresponding to said particular matrix column so that said first and second transducer elements of each group emulate a point source;

receiving signals from N transducer elements of said multiplicity following each of said M transmit events;

converting each of said received signals into a respective digital signal;

decoding M×N digital signals by employing the inverse of said encoding matrix to form a decoded data set; and forming a beamformed data set from said decoded data set.

14. The method as defined in claim 13, wherein said invertible code comprises an orthogonal phase code.

15. The method as defined in claim 14, wherein said orthogonal phase code comprises a Hadamard code.

16. The method as defined in claim 13, wherein the step of driving said first transducer elements and said second transducer elements is performed with either a predetermined pulse waveform or the phase inversion of said predetermined pulse waveform in accordance with values provided by said encoding matrix.

* * * * *